UNITED STATES PATENT OFFICE.

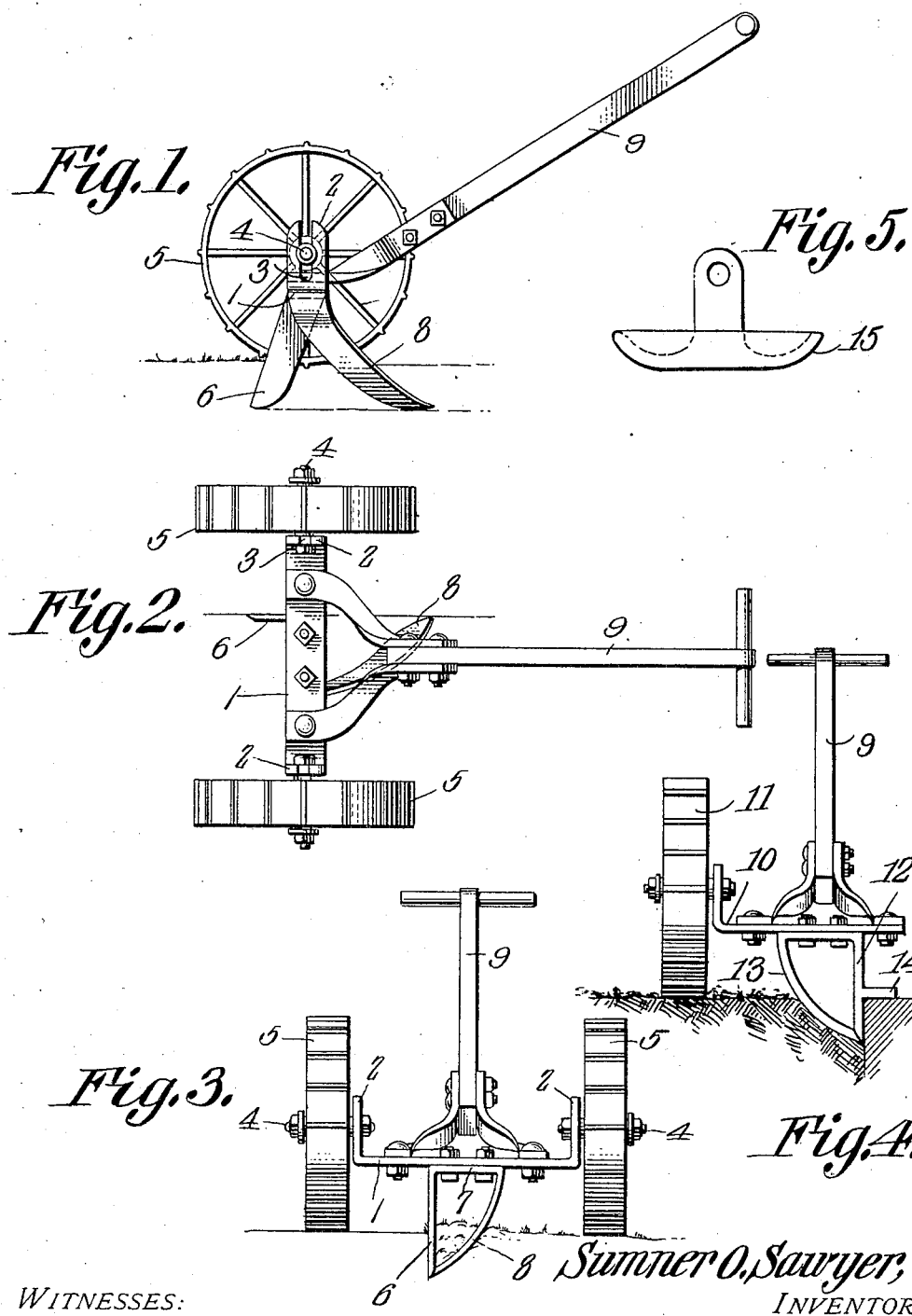

SUMNER O. SAWYER, OF TRAVERSE CITY, MICHIGAN.

LAWN-TRIMMER.

No. 851,840.          Specification of Letters Patent.          Patented April 30, 1907.

Application filed June 29, 1906. Serial No. 324,087.

*To all whom it may concern:*

Be it known that I, SUMNER O. SAWYER, a citizen of the United States, residing at Traverse City, in the county of Grand Traverse and State of Michigan, have invented a new and useful Lawn-Trimmer, of which the following is a specification.

This invention relates to apparatus for trimming the edges of lawns and its object is to provide a machine of this character which is of simple construction, can be readily manipulated, and which will effectually remove sod overhanging the edges of walks, roads, etc.

Another object is to provide a device of this character the cutting parts of which are adjustable so that cuts of desired depths may be produced.

With the above and other objects in view the invention consists of supporting wheels between which is adjustably mounted a cross bar carrying cutting devices one of which is adapted to cut into the soil close to the edge of the walk or road while the other is adapted to cut diagonally into the sod so as to produce a small trench. Means are provided whereby the device may be readily manipulated.

The invention also consists of certain other novel features of construction and combinations of parts which will be hereinafter more fully described and pointed out in the claims.

In the accompanying drawings is shown the preferred form of the invention.

In said drawings: Figure 1 is a side elevation of the device one of the wheels thereof being removed; Fig. 2 is a plan view; Fig. 3 is a front elevation. Fig. 4 is a detail view of a modified form of device; and Fig. 5 is a view of another modification.

Referring to the figures by characters of reference, 1 is a cross bar having upturned parallel arms 2 at its ends each of which is slotted longitudinally as shown at 3 and engaged by a trunnion 4 which is adjustably secured within the slot. These trunnions constitute bearings for wheels 5. A straight knife 6 extends downward from the cross bar preferably at one side of the center thereof and this knife has a lateral extension or head 7 at its upper end which is bolted or otherwise secured to the central portion of the cross bar 1. A rearwardly extending bowed knife 8 is preferably formed with this extension 7 and is disposed with its point in longitudinal alinement with the point of the blade 6. The forward edges of both of these knives are sharpened so that when the machine is moved forward the knives will readily cut into the soil. Handles 9 are secured to the cross bar 1 and by means thereof the device may be readily manipulated.

The knives 6 and 8 are formed in one piece with the head of extension 7 and for convenience in describing this construction of the parts I will hereinafter refer to the knives as being integral, meaning thereby that they are both formed in one piece.

In using the machine the same is pushed forward and the knife 6 will cut into the ground and is adapted to be guided along the edge of the walk or road. During this cutting operation the blade 8 will cut into the sod and the two blades will co-act to produce a shallow trench alongside the walk. By reason of the peculiar shape of the knife 8 a shearing action will be produced thereby and the sod will therefore be cut smoothly. By loosening the trunnions within the slots 3 the cross bar 1 may be adjusted vertically so as to regulate the depth of the cut. The weight of the apparatus is preferably sufficient to force the knives into the soil and to retain them at the proper depth. Downward pressure on the handles 9 however, will also serve to force the knives into the soil and hold them properly placed. While the two knives 6 and 8 have been shown formed integral with the extension 7 it is to be understood that if preferred the knives may be separate and each provided with separate means for securing it to the cross bar.

Instead of utilizing two wheels as shown in Figs. 1 to 3 inclusive I can if preferred construct the device as shown in Fig. 4 wherein the cross bar 10 has a wheel 11 adjustably connected to one end thereof in the same manner as heretofore described but the depending blades 12 and 13 are disposed adjacent the other end of the arm 10 and the blade 12 has a laterally extending supporting flange 14 which is adapted to bear upon the walk or road and slide thereover. This flange serves to limit the downward cut of the knives. Also if preferred the wheel 11 may be dispensed with and a runner 15 substituted therefor.

What is claimed is:

1. A device of the character described comprising wheels, handles for manipulating the same, a cross bar connected to the wheels, and integral cutting devices carried thereby, the lower portions of said devices being disposed one behind the other.

2. In a device of the character described the combination with wheels; of a cross bar carried by the wheels, handles extending therefrom, a knife connected to and depending from the cross bar, and a curved rearwardly inclined knife secured to the cross bar, said knives being integral and the ends of said knives being disposed in longitudinal alinement.

3. In a device of the character described the combination with wheels; of a cross bar supported by the wheels, handles, a straight knife secured to and depending from the cross bar, a rearwardly inclined curved knife secured to the cross bar at one side of the first mentioned knife and integral with said knife, the terminals of said knives being disposed in longitudinal alinement.

4. In a device of the character described the combination with wheels; of a cross bar carried by said arms and bearing within the wheels, handles secured to and extending from the cross bar, a straight knife secured to and depending from the cross bar, and a rearwardly inclined curved knife secured to said cross bar at one side of the first mentioned knife and integral with said knife, the terminals of said knives being disposed in longitudinal alinement.

5. A device of the character described comprising a cross bar, a handle for manipulating the same, a knife connected to and depending from the cross bar, and a curved rearwardly inclined knife secured to the cross bar, the ends of said knives being disposed in longitudinal alinement, both knives being integral.

6. In a device of the character described the combination with a cross bar, and a supporting wheel at one end; of a handle extending from said bar, a knife connected to and depending from the bar, a curved rearwardly inclined knife secured to the cross bar, the ends of said knives being disposed in longitudinal alinement and a supporting device upon one of said knives.

7. An attachment for lawn trimming machines comprising a straight knife, a rearwardly inclined curved knife, all portions of the knives being out of alinement except their free ends, and a head interposed between and integral with the knives.

In testimony that I claim the foregoing as my own, I have hereto affixed my signature in the presence of two witnesses.

SUMNER O. SAWYER.

Witnesses:
LEON F. TITUS,
W. M. KELLOGG.